United States Patent
Ramachandran et al.

(10) Patent No.: US 7,742,448 B2
(45) Date of Patent: Jun. 22, 2010

(54) OPTIMIZING TOPOLOGY LEARNING IN A MULTIHOP NETWORK

(75) Inventors: Shyamal Ramachandran, Heathrow, FL (US); Keith J. Goldberg, Casselberry, FL (US)

(73) Assignee: Motorola, Inc., Schaumburg, IL (US)

( * ) Notice: Subject to any disclaimer, the term of this patent is extended or adjusted under 35 U.S.C. 154(b) by 663 days.

(21) Appl. No.: 11/557,338

(22) Filed: Nov. 7, 2006

(65) Prior Publication Data

US 2008/0107076 A1 May 8, 2008

(51) Int. Cl.
H04W 4/00 (2009.01)
(52) U.S. Cl. .......................... 370/329; 370/338; 455/450
(58) Field of Classification Search ................. 370/329, 370/338, 255; 455/436, 450, 464
See application file for complete search history.

(56) References Cited

U.S. PATENT DOCUMENTS

| 7,447,174 | B2* | 11/2008 | Joshi | 370/328 |
| 2001/0053669 | A1* | 12/2001 | Kado et al. | 455/7 |
| 2006/0160540 | A1* | 7/2006 | Strutt et al. | 455/440 |
| 2007/0086387 | A1* | 4/2007 | Kang et al. | 370/331 |
| 2007/0133500 | A1* | 6/2007 | Rajkotia et al. | 370/348 |
| 2007/0230468 | A1* | 10/2007 | Narayanan et al. | 370/392 |
| 2008/0002608 | A1* | 1/2008 | Zheng et al. | 370/328 |
| 2008/0070582 | A1* | 3/2008 | Cai | 455/450 |
| 2008/0291847 | A1* | 11/2008 | Zheng | 370/255 |

OTHER PUBLICATIONS

IEEE 802.16 Broadband Wireless Access Working Group, "802.16j (Mobile Multihop Relay) Usage Models", IEEE, Sep. 2006, p.p. covers, 1-12.*

* cited by examiner

Primary Examiner—Jayanti K Patel
Assistant Examiner—Jung Park
(74) Attorney, Agent, or Firm—Randi L. Karpinia

(57) ABSTRACT

In a multihop network having a first type of node, a second type of node and a third type of node, techniques are provided for optimizing topology learning in the multihop network which can reduce the amount of control traffic that occurs due to frequent topology changes. For example, each of the nodes can transmit a node identifier and status information to the first type of node. The status information associated with each node can include a node type and a mobility state of the node. The first type of node can store the node identifier and the status information from each of the nodes. The first type of node can reserve or allocate a channel resource to each of the second type of nodes having a mobile state. The channel resource is used by the second type of node for exchanging topology information with the first type of node.

28 Claims, 7 Drawing Sheets

US 7,742,448 B2

OPTIMIZING TOPOLOGY LEARNING IN A MULTIHOP NETWORK

FIELD OF THE INVENTION

The present invention relates generally to wireless communications and more particularly to multihop communication networks which utilize relay stations to facilitate communication between a base station and one or more nodes.

BACKGROUND

An infrastructure-based wireless network typically includes a communication network with fixed and wired gateways. Many infrastructure-based wireless networks employ a mobile unit which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, an ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multihopping") until the packets reach the destination node. As used herein, the term "multihop network" refers to any type of wireless network which employs routing protocols among nodes which are part of a network. In such situations, each intermediate node routes the packets (e.g., data and control information) to the next node along the route, until the packets reach their final destination The Institute of Electrical and Electronics Engineers (IEEE) 802.16 *Working Group on Broadband Wireless Access Standards* aims to prepare formal specifications for the global deployment of broadband Wireless Metropolitan Area Networks. Among other things, the 802.16 standards define a point-to-multipoint (PMP) system with one hop links between a base station (BS) and a subscriber station (SS). Such network topologies sometimes include pockets of poor-coverage areas. While such coverage voids can be avoided by deploying base stations tightly, this drastically increases both the capital expenditure (CAPEX) and operational expenditure (OPEX) for the network deployment. A cheaper solution is to deploy relay stations (RSs) (also known as relays or repeaters) in the areas with poor coverage. These relay stations can repeat transmissions from the base station so that subscriber stations within communication range of a relay station can continue to communicate with the base station using high data rate links. The incorporation of relay stations in an IEEE 802.16 network transforms it into a multihop network with each node having one or more options to access a network, such as the Internet, via a base station (BS).

For example, networks which comply with the IEEE 802.16j specifications will employ relay stations in an IEEE 802.16e network to provide for range extension and capacity improvements. Depending upon the particular network configuration, a particular subscriber station may gain network access via one or more neighbor relay stations and/or one or more neighbor base stations. In addition, relay stations themselves can have one or more available path options to connect to a particular base station.

BRIEF DESCRIPTION OF THE FIGURES

The accompanying figures, which together with the detailed description below are incorporated in and form part of the specification, serve to further illustrate various embodiments and to explain various principles and advantages all in accordance with the present invention.

Figure 1:
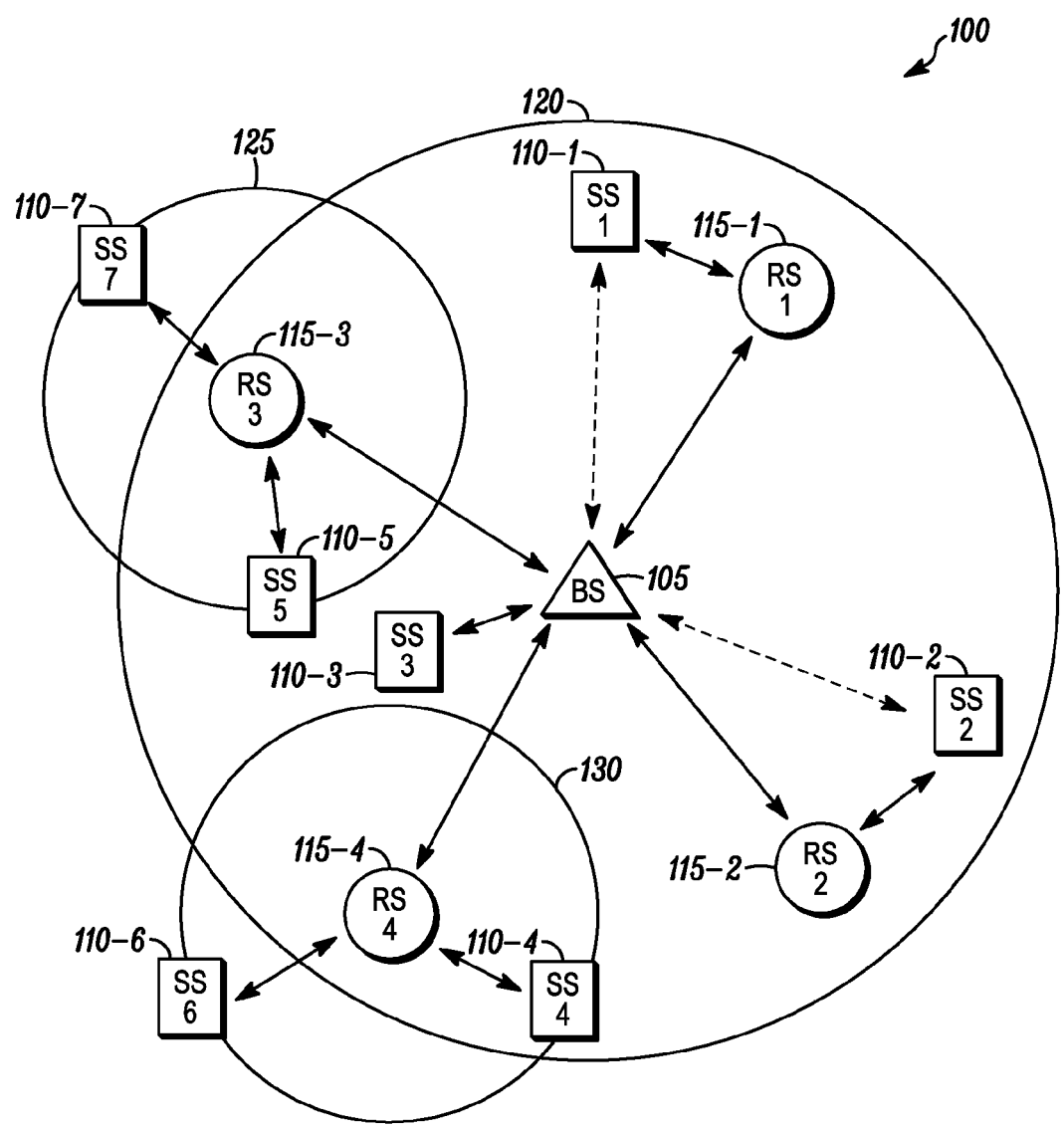
FIG. 1 illustrates an exemplary wireless communication network for use in an exemplary implementation of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to techniques for optimizing topology learning in a multihop network which can reduce the amount of control traffic that occurs due to frequent topology changes. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for optimizing topology learning in a multihop network as described herein. The non-processor circuits may include, but are not limited to, a radio receiver, a radio transmitter, signal drivers, clock circuits, power source circuits, and user input devices. As such, these functions may be interpreted as steps of a method for optimizing topology learning in a multihop network which can reduce the amount of control traffic that occurs due to frequent topology changes. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily designed to allow generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Exemplary Network

FIG. 1 illustrates an exemplary wireless communication network for use in an exemplary implementation of the present invention. FIG. 1 specifically illustrates an IEEE 802.16 network 100. As illustrated, the network 100 includes at least one base station 105 for communication with a plurality of subscriber stations 110-$n$. The exemplary network 100 further includes a plurality of relays 115-$n$ (also known as relay stations or repeaters). The relays 115-$n$ are deployed in the areas with poor coverage and repeat transmissions so that subscriber stations 110-$n$ in a cell boundary can connect using high data rate links. In some cases relays 115-$n$ may also serve subscriber stations 110-$n$ that are out of the coverage range of the base station 105. In some networks, the relays 115-$n$ are simpler versions of the base station 105, in that they do not manage connections, but only assist in relaying data. Alternatively, the relays 115-$n$ can be at least as complex as the base station 105. In FIG. 1, the links shown between the base station 105 and subscriber stations 110-1, 110-2 are shown using a dotted line to represent links characterized by a low Carrier Interference-to-Noise (CINR) ratio, whereas all other links shown using a solid line represent links characterized by a high Carrier Interference-to-Noise (CINR) ratio.

Figure 2:
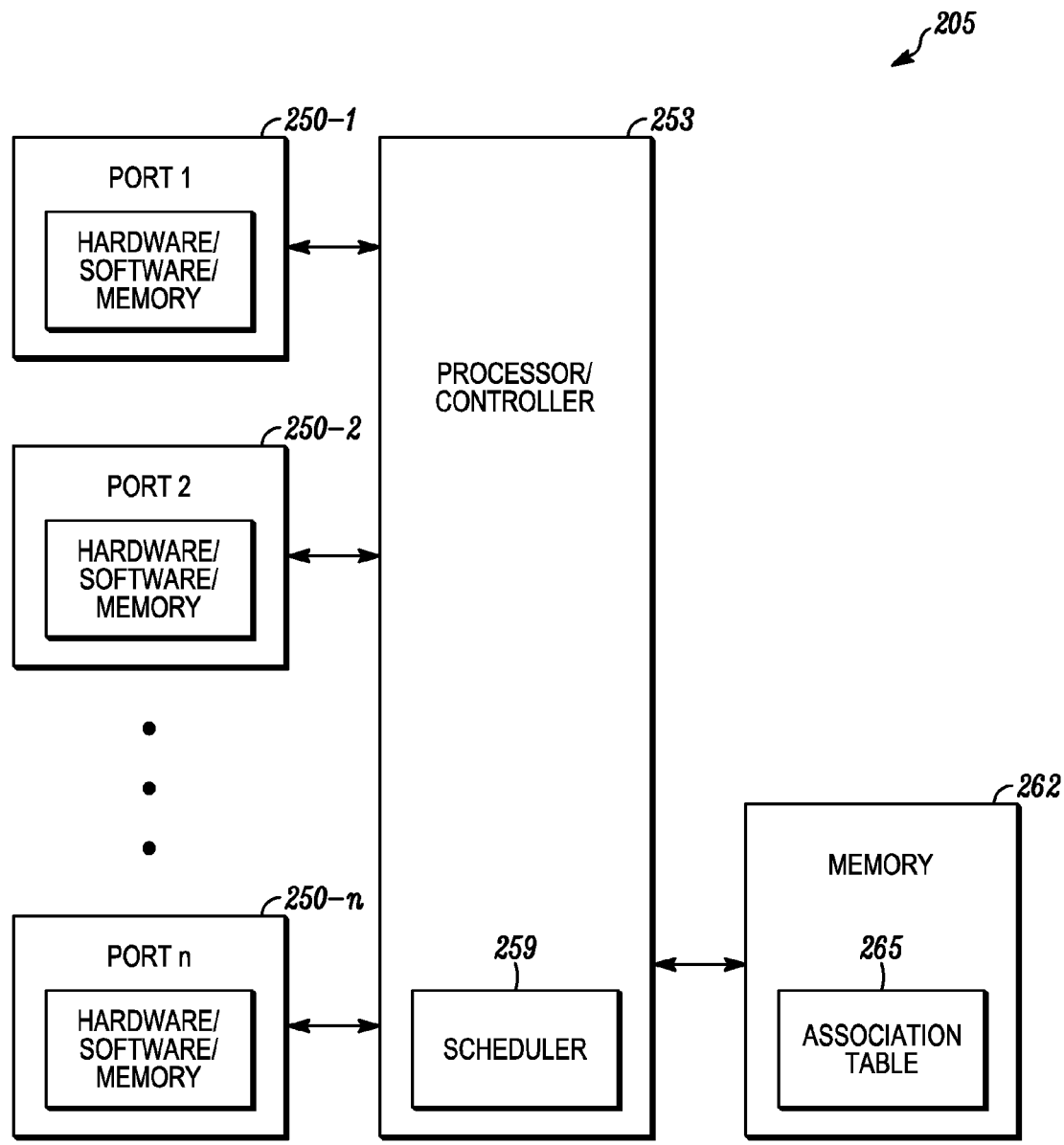
FIG. 2 illustrates an exemplary base station in accordance with some embodiments of the present invention.

FIG. 2 illustrates an exemplary base station 205 in accordance with some embodiments of the present invention. As illustrated, the base station 205 comprises a plurality of ports 250-$n$, a controller 253, and a memory 262.

Each port 250-$n$ provides an endpoint or "channel" for network communications by the base station 205. Each port 250-$n$ may be designated for use as, for example, an IEEE 802.16 port or a backhaul port or an alternate backhaul port. For example, the base station 205 can communicate with one or more relay stations and/or one or more subscriber stations within an 802.16 network using an IEEE 802.16 port. An IEEE 802.16 port, for example, can be used to transmit and receive both data and management information.

A backhaul port similarly can provide an endpoint or channel for backhaul communications by the base station 205. For example, the base station 205 can communicate with one or more other base stations using the backhaul, which can be wired or wireless, via the backhaul port.

Each of the ports 250-$n$ are coupled to the controller 253 for operation of the base station 205. Each of the ports employs conventional demodulation and modulation techniques for receiving and transmitting communication signals respectively, such as packetized signals, to and from the base station 205 under the control of the controller 253. The packetized data signals can include, for example, voice, data or multimedia information, and packetized control signals, including node update information.

The controller 253 includes a scheduler block 259. It will be appreciated by those of ordinary skill in the art that the scheduler block 259 and the parameters utilized therein can be hard coded or programmed into the base station 205 during manufacturing, can be programmed over-the-air upon customer subscription, or can be a downloadable application. It will be appreciated that other programming methods can be utilized for programming the scheduler block 259 into the base station 205. It will be further appreciated by one of ordinary skill in the scheduler block 259 can be hardware circuitry within the base station. In accordance with the present invention, the scheduler block 259 can be contained within the controller 253 as illustrated, or alternatively can be an individual block operatively coupled to the controller 253 (not shown).

To perform the necessary functions of the base station 205, the controller 253 is coupled to the memory 262, which preferably includes a random access memory (RAM), a read-only memory (ROM), an electrically erasable programmable read-only memory (EEPROM), and flash memory. The memory 262 includes storage locations for the storage of an association table 265.

It will be appreciated by those of ordinary skill in the art that the memory 262 can be integrated within the base station 205, or alternatively, can be at least partially contained within an external memory such as a memory storage device. The memory storage device, for example, can be a subscriber identification module (SIM) card.

Figure 3:
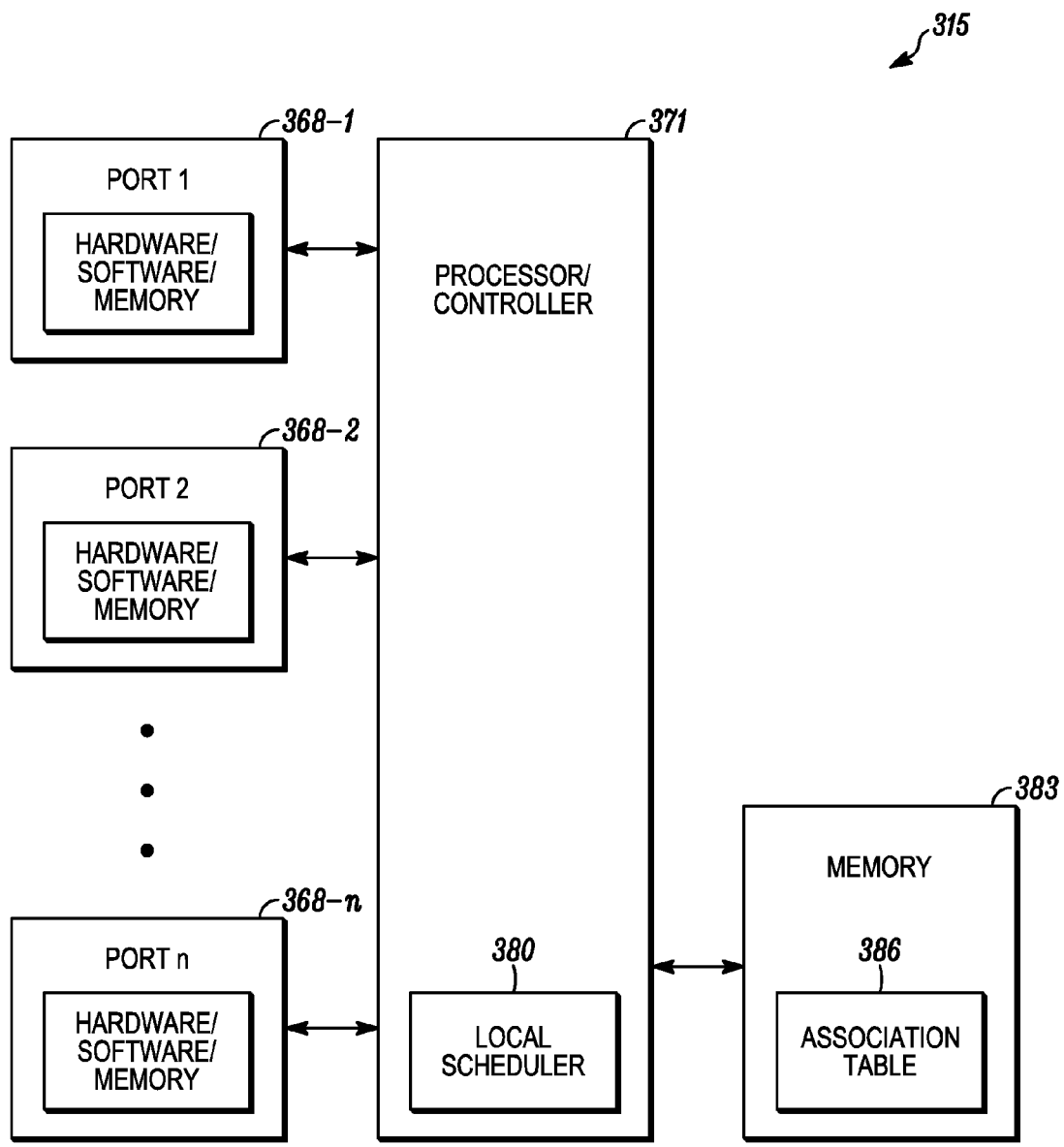
FIG. 3 illustrates an exemplary relay station in accordance with some embodiments of the present invention.

FIG. 3 illustrates an exemplary relay station 315 in accordance with some embodiments of the present invention. As illustrated, the relay station 315 comprises a plurality of ports 368-n. Each port 350-n may be designated for use as, for example, an IEEE 802.16 port or a backhaul port or an alternate backhaul port. For example, the plurality of ports 368-n can include an IEEE 802.16 port, which is used to communicate with one or more base stations, one or more relay stations and/or one or more subscriber stations. The relay station 315 further comprises a controller 371 and a memory 383.

An IEEE 802.16 port, for example, provides an endpoint or "channel" for 802.16 network communications by the relay station 315. For example, the relay station 315 can communicate with one or more base stations and/or one or more relay stations and/or one or more subscriber stations within an 802.16 network using the IEEE 802.16 port. An IEEE 802.16 port, for example, can be used to transmit and receive both data and management information.

Each of the ports 368-n are coupled to the controller 371 for operation of the relay station 315. Each of the ports employs conventional demodulation and modulation techniques for receiving and transmitting communication signals respectively, such as packetized signals, to and from the relay station 315 under the control of the controller 371. The packetized data signals can include, for example, voice, data or multimedia information, and packetized control signals, including node update information.

In accordance with the present invention, the controller 371 includes a local scheduler 380. It will be appreciated by those of ordinary skill in the art that the local scheduler 380 and the parameters utilized therein can be hard coded or programmed into the relay station 315 during manufacturing, can be programmed over-the-air upon customer subscription, or can be a downloadable application. It will be appreciated that other programming methods can be utilized for programming the local scheduler 380 into the relay station 400. It will be further appreciated by one of ordinary skill in the art that the alternate backhaul detection mechanism can be hardware circuitry within the relay station 315. In accordance with the present invention, the local scheduler 380 can be contained within the controller 371 as illustrated, or alternatively can be individual blocks operatively coupled to the controller 371 (not shown). The operation of each of these blocks will be described herein.

To perform the necessary functions of the relay station 315, the controller 371 and the local scheduler 380 are each coupled to the memory 383, which preferably includes a random access memory (RAM), a read-only memory (ROM), an electrically erasable programmable read-only memory (EEPROM), and flash memory. The memory 383 includes storage locations for the storage of a neighbor table 386.

It will be appreciated by those of ordinary skill in the art that the memory 383 can be integrated within the relay station 315, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes some form of interface for communicating with the relay station 315.

In typical systems such as the network 300, IEEE 802.16 base stations (BSs) do not forward traffic to other base stations on the IEEE 802.16 air interface. Further, IEEE 802.16 Relays (RSs) can forward traffic to base stations, relay stations, or subscriber stations (SSs). As previously mentioned, the relay stations are themselves managed/controlled by at least one of the base stations. Further relay stations can be fixed, nomadic or mobile.

As illustrated in FIG. 1, the relay stations 115-n of the network 100 can provide communication coverage outside the base station coverage area 120. For example, a relay station 3 115-3 provides a coverage area 125 and a relay station 4 115-4 provides a coverage area 130 which include communication coverage outside of a coverage area 120 of the base station 105. Thus communication by relay station 3 115-3 can include communication for subscriber station 7 110-7; and communication by relay station 4 115-4 can include communication for subscriber station 6 110-6, which otherwise would not be possible directly to the base station 105. Since subscriber station 6 110-6 and subscriber station 7 110-7 cannot be controlled by the base station 105 directly, they are entirely controlled by the relay stations 115-4 and 115-3 respectively, or by the base station 105 through the relay stations 115-4 and 115-3 respectively.

In summary, the relay stations introduced in an IEEE 802.16 system, can provide coverage and capacity gains by extending the base station's range and permitting subscriber stations to multihop to the base station.

Exemplary Network Having a Mobile Relay Station (MRS)

Figure 4:
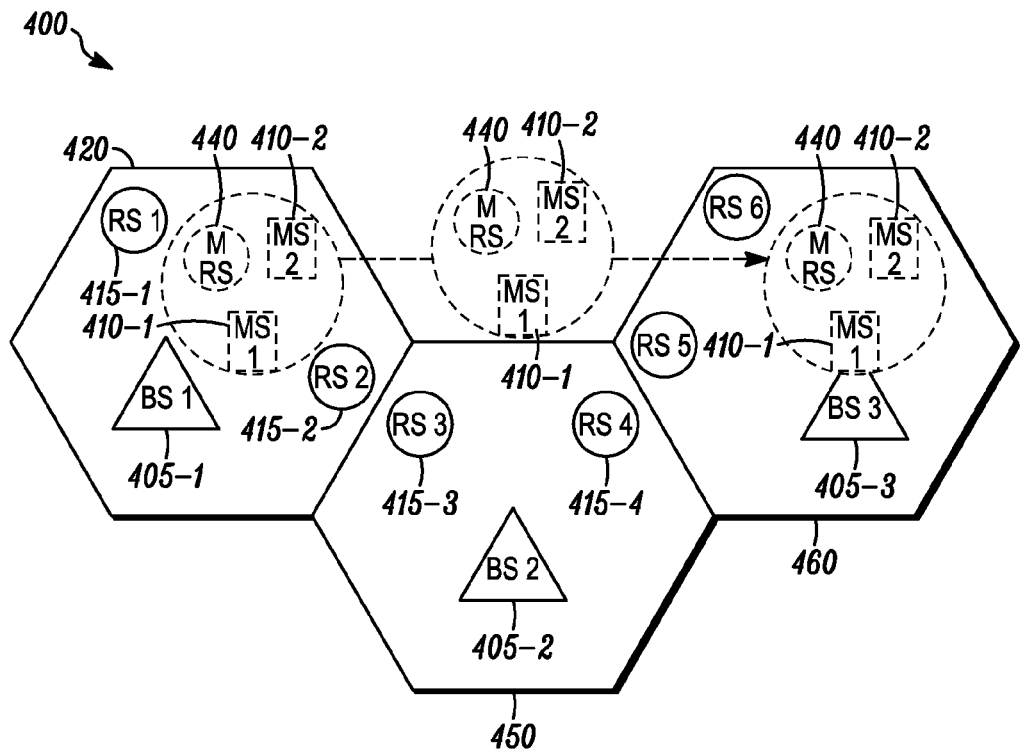
FIG. 4 is a block diagram of an exemplary ad hoc communication network which comprises a plurality of planned multihop cells (PMHCs) and a mobile relay station (MRS)

FIG. 4 is a block diagram of an exemplary ad hoc communication network 400 which comprises a plurality of multihop cells (MHCs) 420, 450, 460, and a mobile relay station (MRS) 440. In one exemplary implementation, the communication network 400 complies with the IEEE 802.16j standard.

Multihop cell 420 comprises a base station (BS1) 405-1, a fixed relay station (RS1) 415-1, and a fixed relay station (RS2) 415-2. Similarly, multihop cell 450 comprises a base station (BS2) 405-2, a fixed relay station (RS3) 415-3, and a fixed relay station (RS4) 415-4. In addition, multihop cell 460 comprises a base station (BS3) 405-3, a fixed relay station (RS5) 415-5, and a fixed relay station (RS6) 415-6. Each of the MHCs 420, 450, 460 are defined by a coverage area of their respective base stations 405-1, 405-2, 405-3. While depicted as having a hexagonal coverage area, it will be appreciated that in reality, the coverage area of each cell is substantially elliptical (e.g., circular) since the base stations radiate communications signals in a substantially equal manner in all directions.

Base stations (BS1, BS2, BS3) 405-1, 405-2, 405-3 are typically coupled to a wired network (not shown) and can provide one or more sources of audio, video and/or data information. Base stations (BS1, BS2, BS3) 405-1, 405-2, 405-3 may be, for example, a cellular base station or other wireless access point. In this particular network 400, each of the base stations (BS1, BS2, BS3) 405-1, 405-2, 405-3 can implement centralized routing and scheduling algorithms. Each of the base stations (BS1, BS2, BS3) 405-1, 405-2, 405-3 is responsible for frame time allocations throughout its respective "multihop cell" (comprising all its relay stations (RSs) and subscriber stations (SSs) communicatively associated with them). Each of the base stations (BS1, BS2, BS3) 405-1, 405-2, 405-3 is responsible for making routing decisions for the different multihop network entities in the network.

Fixed relays stations (RS1-RS6) 415-1, 415-2, 415-3, 415-4, 415-5, 415-6 provide range extension and coverage or capacity improvements. The incorporation of relay stations (RSs) in an IEEE 802.16 network transforms it into a multihop network with each node having one or more options to access a network, such as the Internet, via a base station (BS) 405-1, 405-2, 405-3. In addition, relay stations (RSs) 415-1, 415-2, 415-3, 415-4, 415-5, 415-6 themselves can have one or more available path options to connect to a base station (BS).

Mobile relay station 440 has two mobile stations or nodes 410-1, 410-2 (also referred to herein as subscriber stations) which remain within its proximity while the mobile relay station 440 moves throughout the network (e.g., nodes 410-1, 410-2 move along with mobile relay station 440). In the particular example shown in FIG. 4, the mobile relay station 440 is initially located in the coverage area of cell 420 at a first time, moves between the cells at a second time, and moves into the coverage area of cell 460 at a third time. In other words, the mobile relay station 440 moves from the coverage area of base station 1 405-1 to the coverage area of base station 3 405-3. In the middle part of the trajectory of the mobile relay station 440, the mobile relay station 440 is outside of the planned cell of any base station, however, the mobile relay station 440 might maintain connectivity with a base station or a relay station (even when out of the cell) via high gain antennas.

As the mobile relay station 440 moves through each of these locations, the mobile relay station 440 can connect to the corresponding base station 405-1, 405-2, 405-3 either directly or via one or more neighbor relay stations 415-1, 415-2, 415-3, 415-4, 415-5, 415-6. Moreover, the nodes 410-1, 410-2 or subscriber stations (SSs) may gain network access via one or more neighbor relay stations (RSs) 415-1, 415-2, 415-3, 415-4, 415-5, 415-6 and/or one or more neighbor base stations (BSs) 405-1, 405-2, 405-3.

Overview

In networks which comply with IEEE Standards, such as IEEE 802.16j type networks, nodes such as relay stations and subscriber stations are tightly time and frequency synchronized to one and only one upstream node at any time. A transmission from an IEEE 802.16 device can be decoded only at downstream devices or one upstream device. Therefore packets from one branch of a tree can be sent to nodes in another branch of the tree only through the base station. As such, broadcast dissemination of topology information (such as that which occurs in the IEEE 802.11 based multihop or mesh networks) can not occur in the IEEE 802.16j networks.

To provide greater control over the network it is likely that IEEE 802.16j networks will be largely centralized with many decisions being made at the base station (BS). For example, it is likely that centralized routing and scheduling algorithms will be implemented within the base station (BS). It is likely that the base station (BS) will be responsible for frame time allocations throughout its "multihop cell" (comprising all its relay stations (RSs) and subscriber stations (SSs) attached to them). It is likely that the base station (BS) will also be responsible for making routing decisions for the different multihop network entities.

In some implementations, mobile relay stations (MRSs) will be deployed on mobile platforms such as buses and trains. As such, these MRSs will experience frequent topology changes since the environment or network topology around a mobile relay station is likely to change at a significant rate. If most topology decisions are to be made centrally at the base station, topology related control traffic itself will place a significant burden on the base station scheduler. Thus, when MRSs in the multihop network are involved in a significant number of topology changes, large amounts of topology change information will be generated and sent to the base station. The MRSs will likewise receive topology related instructions from the base station. Thus, an increasing quantity of control traffic will be generated and transferred between the base station and the relay stations.

The present invention provides techniques for optimizing topology learning in a multihop network to reduce the amount of control traffic that is generated due to frequent topology changes. In one implementation, the multihop network includes a first type of node (e.g., a base station), a second type of node (e.g., a relay station) and a third type of node (e.g., a subscriber station), and can be implemented such that it complies with the IEEE 802.16j standard. The second type of node can transmit a node identifier and status information to the first type of node. The status information associated can include a node type and a mobility state of the node. The first type of node can store the node identifier and the status information from each of the nodes. The first type of node can reserve or allocate a channel resource to the second type of node which has a mobile state. The channel resource can be used by the second type of node for exchanging topology information with the first type of node. For instance, with reference to the example shown in FIG. 4, as MRS 440 moves out of the coverage area of BS1 405-1, it can associate with BS2 405-2. When BS2 405-2 learns that MRS 440 is mobile and that it supports nodes 410-1, 410-2, BS2 405-2, it now allocates channel resources to the MRS 440 for exchanging topology information. The topology information which is exchanged can comprise, for example, at least one of: handoff information, routing information, link quality information, measurement reports information, and Quality of Service information. By reducing control traffic, additional network capacity is available for subscriber data.

Before describing these techniques with reference to FIGS. 6-8, an exemplary data structure will be described which can be transmitted by a node (e.g., a relay station) to another node (e.g., a base station) with reference to FIG. 5.

Figure 5:
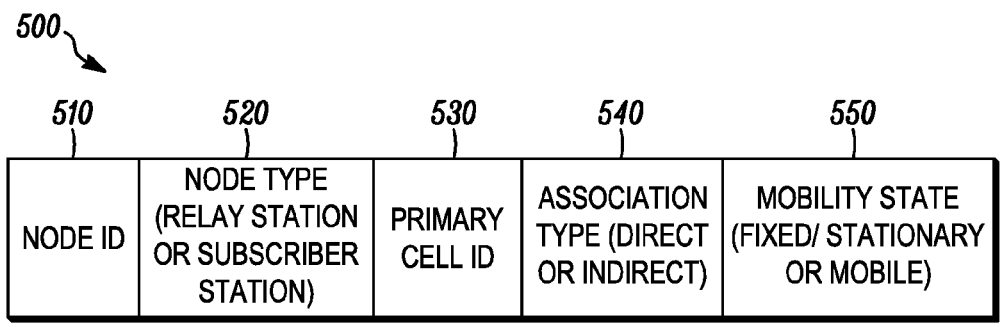
FIG. 5 is a data structure showing an exemplary format of a mobility message in accordance with some embodiments of the invention.

FIG. 5 is a data structure showing an exemplary format of a mobility message 500 in accordance with some embodiments of the invention. The mobility message 500 comprises a node identifier (ID) field 510, a node type field 520, a primary cell identifier (ID) field 530, an association type field 540 and a mobility state field 550. The node identifier (ID) field 510 identifies a particular node in a network and can be, for example, a MAC address, an IP address, a unique Connection Identifier (CID) or other identifier, or unique combinations of one or more of these identifiers. The node type field 520 specifies the type of node, such as, a relay station or subscriber station. The primary cell identifier (ID) field 530 specifies the base station ID, the access station ID, the base station MAC address, the access station MAC address, the base station IP address, the access station IP address, or any other unique base station or access station identifier, where an access station comprises any station through which the mobile relay station sends information to (e.g., a base station, another relay station). The association type field 540 specifies the node's association with a base station. This association can be direct, meaning that the node is directly communicating with the base station, or indirect, meaning that the node is indirectly communicating with the base station through another node such as a relay station. The mobility state field 550 specifies the mobility state of the node at a particular time (e.g., whether the particular node is mobile or fixed/stationary).

Figure 6:
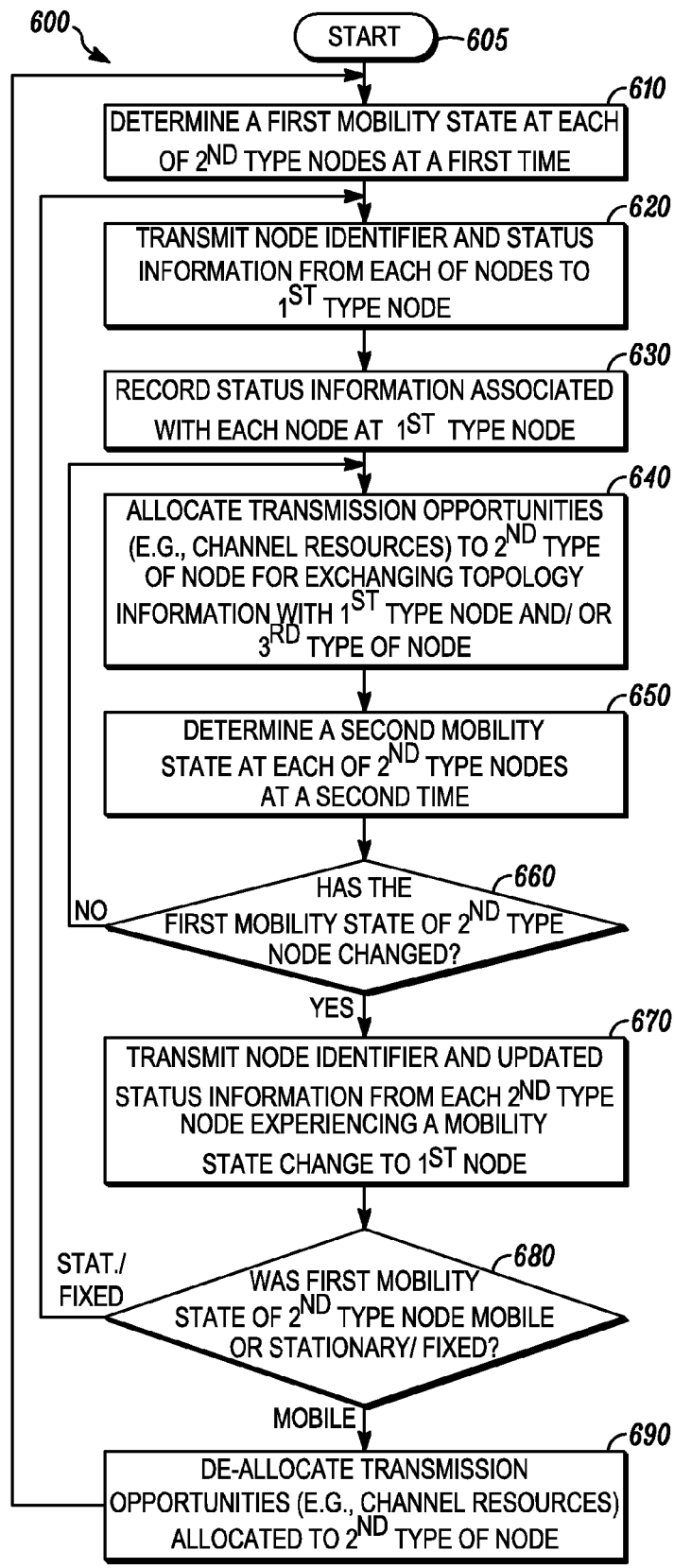
FIG. 6 is a flowchart showing an exemplary method for optimizing topology learning in a multihop network in accordance with some embodiments of the invention.

FIG. 6 is a flowchart showing an exemplary method 600 for optimizing topology learning in a multihop network in accordance with some embodiments of the invention. The method 600 can reduce the amount of control traffic that occurs due to frequent topology changes in a multihop network.

Generally, the method 600 can be applied in a multihop network comprising a first type of node and a plurality of other nodes comprising at least one of a second type of node and a third type of node. For purposes of simplicity in the following description of method 600, the first type of node is referred to as a base station, the second type of node is referred to as a relay station (e.g., a node having a relay station node type), and the third type of node is referred to as a subscriber station (e.g., a node having a subscriber station node type). Moreover, although the following description describes a scenario where a single base station is utilized, it will be appreciated that the multihop network can include any number or combination of base stations, relay stations and subscriber stations.

In addition, method 600 can be applied to other scenarios where the first type of node is a first relay station, and the second type of node is a second relay station and the first relay station is located along a route between the base station and the second relay station such that the second relay station communicates with the base station via the first relay station. In this scenario, functionality for optimizing topology learning that is described below as taking place at the base station can be replicated at the first relay station. In other words, this functionality can be distributed throughout the network so that the base station can implement the method 600 for optimizing topology learning with respect to its one hop mobile relay stations, and the first relay station can implement the method 600 for optimizing topology learning with respect to its one hop mobile relay stations which are two or more hops from the base station. Although the exemplary implementation describes a scenario where the base station reserves or allocates a channel resource to each of the mobile relay stations, in an alternative implementation where intermediate relay stations are located between the base station and the mobile relay station, the base station can allocate resources at itself and to all the intermediate relay stations between itself and the mobile relay station. In other words, the base station operates in a multihop manner and allocates resources along a path to a first relay station, to a second relay station, and the like.

In one exemplary implementation, the multihop network complies with the IEEE 802.16j standard.

The method 600 starts at step 605, and at step 610 each of the nodes (including the relay stations) determine its current mobility state (e.g., a first mobility state at a first time). For example, in one implementation, each relay node can determine whether it is currently mobile or currently non-mobile (e.g., fixed or currently stationary) at the first time. In other words, each relay station can determine if its neighborhood is changing in such a manner as to result in a topology change frequency such that the particular relay station should consider itself mobile. In one implementation, each relay node can determine whether it is currently mobile or non-mobile using its local capability to determine if it is in fact mobile. Such local capability can include, but is not limited to, using Global Positioning Satellites (GPS), using terrestrial positioning systems and navigational systems, using know fixed reference transmitters and measuring varying signal strengths, processing mobility related information and announcements from other fixed and mobile stations. Such local capability can also include looking up local customization or design settings.

At step 620, each of the nodes in the network transmits a node identifier and status information to the base station. In one implementation, such as that shown in FIG. 5, the status information associated with each node comprises: a node type, a mobility state and an association type. The node type can be either a relay station or a subscriber station. The mobility state of each node can be either a non-mobile (e.g., a fixed state or a stationary state) state or a mobile state. For example, in one exemplary implementation, when a relay station determines that it is mobile, it informs the base station of its "mobile" state. For instance, the status information associated with the relay station includes either a mobile state or a fixed/stationary state. The relay stations which have the relay station node type and the mobile state will be viewed by the base station as "mobile relay stations." The association type can be either a direct association type or indirect association type, where the direct association type indicates that the node is communicating directly with the base station without assistance of any intermediate node(s), and where the indirect association type indicates that the node is communicating indirectly with the base station with assistance of at least one intermediate node.

By transmitting a node identifier and status information to the base station, the mobile relay stations (e.g., one of the relay stations which detects its mobility) can inform the base station when it is mobile or in a mobile neighborhood. The relay station can send an unsolicited capability update (which includes its node identifier and status information) to the base station thereby declaring its mobility state. In one implementation, the relay station can send a special dedicated message which includes its node identifier and/or its status information.

At step 630, the base station stores and/or records the node identifier and corresponding status information which it receives from each of the nodes. The base station stores the node identifier and corresponding status information in an association table maintained at the base station. For example, in one exemplary implementation, the base station maintains a local association table of the capabilities of all associated devices. To illustrate an example of an association table with respect to FIG. 4, BS1 would have an association table as shown below in Table 1.

TABLE 1

| Node ID | Node Type (RS or SS) | Primary CID | Association Type (Direct or Indirect) | Mobility State (Fixed/Stationary OR Mobile) |
|---|---|---|---|---|
| RS1 | RS | CID1 | Direct | Fixed |
| RS2 | RS | CID2 | Direct | Stationary |
| MRS | RS | CID3 | Direct | Mobile |
| MS1 | Subscriber | CID4 | Indirect (via MRS) | Stationary |
| MS2 | Subscriber | CID5 | Indirect (via MRS) | Mobile |

With reference to FIG. 5, a mobile relay station (MRS) can be identified by the base station as being a node which has a "relay station node type" (per column 2, row 4 of Table 1), a "primary cell identifier CID3" (per column 3, row 4 of Table 1) a "direct association type" (per column 4, row 4 of Table 1) and a "mobile state" (per column 5, row 4 of Table 1). By contrast, a non-mobile relay station (RS1) can be identified by the base station as being a node which has a "relay station node type" (per column 2, row 2 of Table 1), a "primary cell identifier CID1" (per column 3, row 2 of Table 1) a "direct association type" (per column 4, row 2 of Table 1) and a "fixed state" (per column 5, row 2 of Table 1). Similarly, non-mobile relay station (RS2) can be identified by the base station as being a node which has a "relay station node type" (per column 2, row 3 of Table 1), a "primary cell identifier CID2"

(per column 3, row 3 of Table 1) a "direct association type" (per column 4, row 3 of Table 1) and a "stationary state" (per column 5, row 3 of Table 1).

At step 640, the base station can allocate or reserve a channel resource or channel resources to each of the mobile relay stations (e.g., relay stations having a mobile state) and to all nodes along the communication path or route between the base station and the mobile relay station. Stated differently, the base station allocates at least one transmission opportunity to each mobile relay station. This "transmission opportunity" allocation can be an unsolicited periodic grant of any known channel resource to the mobile relay station which can be used by the mobile relay station for exchanging topology information (e.g., topology updates) with the base station. In this description, the term "channel resource" can generally refer to at least one of: a time slot, a frame zone, a particular set of frequencies, a Walsh code or other time, frequency or code space.

The updated topology information that is exchanged can be, for example, the relay station's neighbor report, the relay station's association report, or other related topology information. In one implementation, "topology information" can be handoff information. In another implementation, "topology information" can be routing information. In yet another implementation, "topology information" can be link quality information. In still another implementation, "topology information" can be measurement reports information. In another implementation, "topology information" can be Quality of Service information.

In some embodiments, the base station can also allocate a second channel resource to each of the mobile relay stations (e.g., relay stations having the mobile state) for subscriber stations associated with the particular mobile relay station. In other words, the base station can grant unsolicited periodic transmission opportunities of the second channel resource for subscriber stations associated via mobile relay stations. The second channel resource is for exchanging topology information with the subscriber stations which are associated with the relay station (e.g., which have the indirect association type). In one implementation, the mobile relay station and its associated subscriber stations can use the second channel resource for exchanging handoff information (e.g., relaying handoff messages between the base station and the subscriber stations associated with the particular mobile relay station). For example, with reference to the scenario shown in FIG. 4, BS1 405-1 can also grant periodic unsolicited allocations for MS1 410-1 and MS2 410-2 for their handoff message exchange since they are associated via MRS 440. In one implementation, the amount of channel resources which are allocated is proportional to the number of subscriber stations associated with the mobile relay station.

Such unsolicited allocations will significantly reduce control overhead in each frame. An MRS only needs to be told of its allocation once in several frames. This reduces the size of the map (MAP) messages transmitted in each frame. For example, within the context of 802.16, the MAP messages can define the structure and utilization of the frame which follows next.

Unsolicited allocations also avoid bandwidth request transmissions from the mobile relay station, which in turn leave more capacity for user data. This enables better utilization of the air time, as nodes that are capable of measuring true mobility avail to the unsolicited periodic grants only when necessary.

At step 650, each of the nodes (including the relay stations) can determine a new mobility state at a second time. After the second time, at step 660, each of the relay stations which determine that their first mobility state has changed can determine whether their respective first mobility state was mobile or non-mobile.

Each of the relay stations which determine that their respective first mobility state was non-mobile (e.g., that their respective first mobility state has changed from a non-mobile mobility state to a mobile mobility state) can transmit their node identifier and updated status information to the base station at step 620.

Alternatively, a relay station can also update its mobility state with the base station when it determines that it is no longer mobile. For example, each of the relay stations which determine that their respective first mobility state was mobile (e.g., that their respective first mobility state has changed from mobile to non-mobile) can communicate their node identifier and updated status information (which reflects the change in their mobility state) to the base station at step 670.

At step 680, upon receiving mobility updates from the relay stations, the base station can take away or de-allocate the previously allocated channel resources reserved for the relay stations which have become non-mobile (e.g., the relays stations which have determined that they have experienced a change to a non-mobile mobility state) during the period between the first time and the second time. The non-mobile relay stations then contend for or request channel resources for communicating topology information with the base station.

Figure 7:
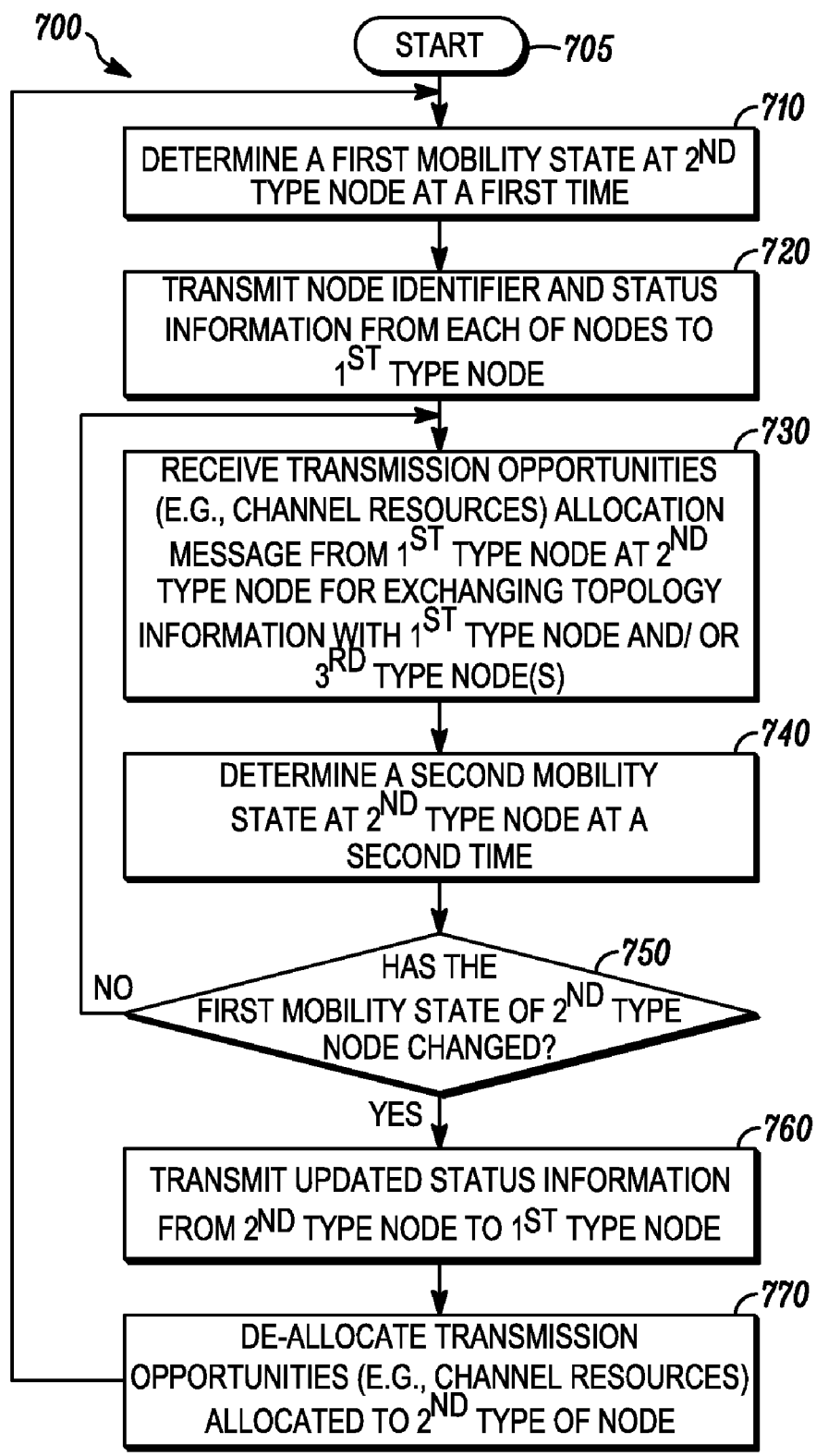
FIG. 7 is a flowchart showing an exemplary method for operating a relay station within the multihop network to optimize topology learning in the multihop network in accordance with some embodiments of the invention.

FIG. 7 is a flowchart showing an exemplary method 700 for operating a relay station within a multihop network to optimize topology learning in the multihop network in accordance with some embodiments of the invention. The method 700 can reduce the amount of control traffic that is generated due to frequent topology changes in a multihop network.

Generally, the method 700 can be applied in a multihop network comprising a first type of node and a plurality of other nodes comprising at least one of a second type of node and a third type of node. For purposes of simplicity in the following description of method 700, the first type of node is referred to as a base station, the second type of node is referred to as a relay station (e.g., a node having a relay station node type), and the third type of node is referred to as a subscriber station (e.g., a node having a subscriber station node type). Moreover, although the following description describes a scenario where a single base station is utilized, it will be appreciated that the multihop network can include any number or combination of base stations, relay stations and subscriber stations.

In addition, it will be appreciated that the method 700 can be applied to other scenarios where the first type of node is a first relay station, and the second type of node is a second relay station and the first relay station is located along a route between the base station and the second relay station such that the second relay station communicates with the base station via the first relay station. In this scenario, functionality for optimizing topology learning that is described below as taking place at the base station can be replicated at the first relay station can be distributed throughout the network so that the base station can implement the method 700 for optimizing topology learning with respect to its one hop mobile relay stations, and the first relay station can implement the method 700 for optimizing topology learning with respect to its one hop mobile relay stations which are two hops from the base station.

In one exemplary implementation, the multihop network complies with the IEEE 802.16j standard.

The method 700 starts at step 705, and at step 710, a relay station can determine its current mobility state (e.g., a first mobility state of the relay station at a first time). For example, in one implementation, the relay station can determine whether it is currently mobile or currently non-mobile (e.g., fixed or currently stationary) at the first time. In other words, the relay station can determine if its neighborhood is changing and resulting in topology changes frequently enough such that the relay station should consider itself mobile. In one implementation, the relay node can determine whether it is currently mobile or non-mobile using their local capability described above to determine if it is in fact mobile.

At step 720, the relay station can transmit a node identifier and status information to the base station. The status information associated with the relay station comprises: a relay station node type and a mobility state of the node comprising either a fixed/stationary state or a mobile state.

At step 730, assuming the relay station has a mobile state (e.g., the relay station is a mobile relay station), then the mobile relay station can receive a first message from the base station which specifies a channel resource or resources allocated to the mobile relay station by the base station for exchanging topology information with the base station. In addition, in some implementations, the first message further specifies a second channel resource allocated to the relay station by the base station for exchanging other topology information with subscriber stations which are associated with the relay station and communicate with the base station via the relay station. The topology information can comprise at least one of: handoff information, routing information, link quality information, measurement reports information, and Quality of Service information.

At step 740, the mobile relay station can determine a new mobility state of the mobile relay station at a second time.

At step 750, after the second time, the mobile relay station can determine whether its first mobile mobility state has changed with respect to its new mobility state. If the mobile relay station determines that its first mobility state has not changed (e.g., the mobile relay station is still mobile), then the method 700 loops back to step 730.

If the mobile relay station determines that its first mobility state has changed to a non-mobile state, then at step 760 the mobile relay station can transmit its node identifier and updated status information to the base station. The updated status information reflects that the mobile relay station is currently not moving (non-mobile). For example, because the mobile relay station will determine that its first mobility state was mobile and that the mobile relay station has experienced a change to a non-mobile mobility state during a period between the first time and the second time), then at step 760 the mobile relay station will transmit its node identifier and updated status information to the base station. At step 770, the base station de-allocates the previously allocated channel resources that were reserved for the relay station.

Figure 8:
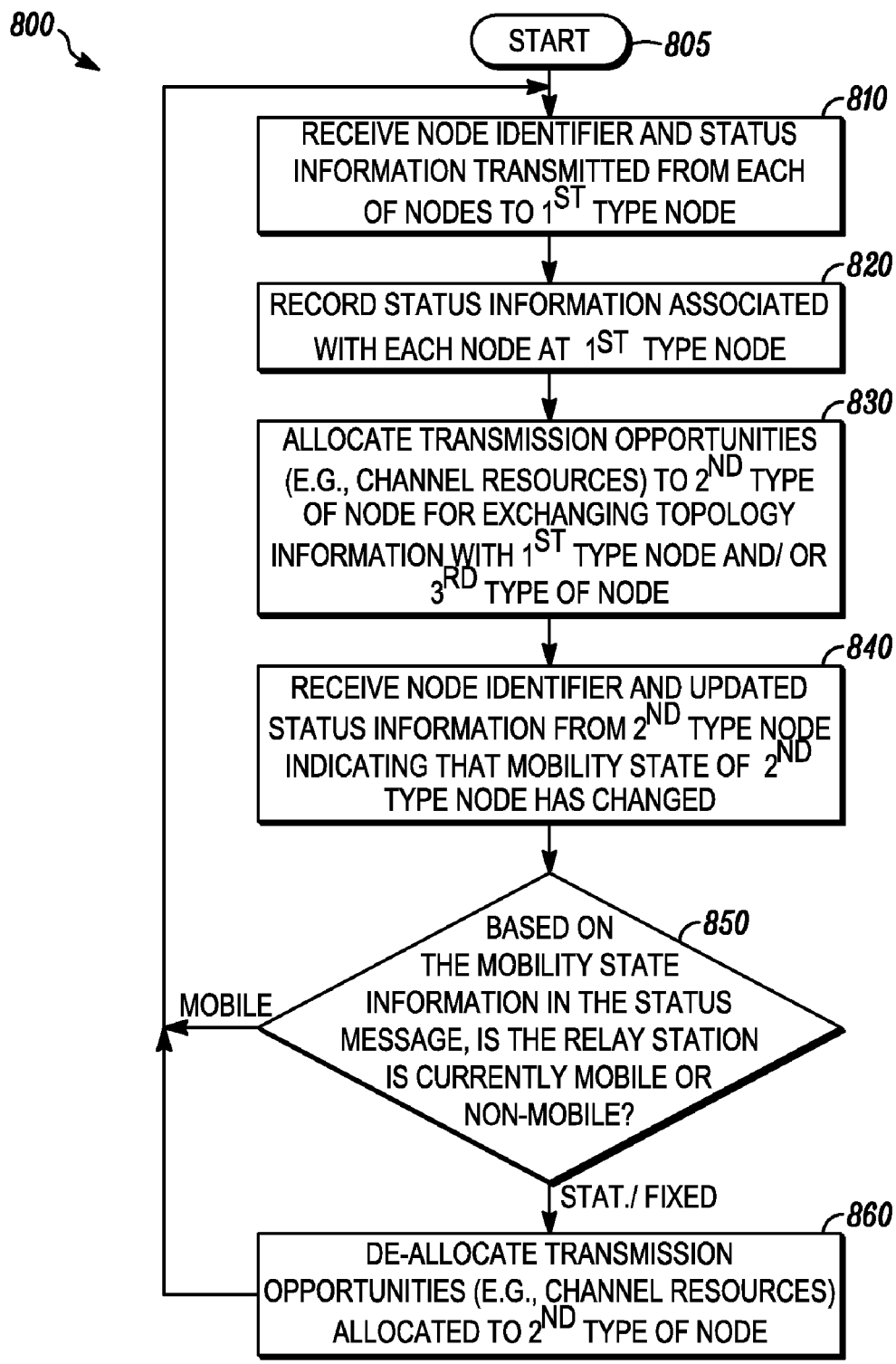
FIG. 8 is a flowchart showing an exemplary method for operating a base station within the multihop network to optimize topology learning in the multihop network in accordance with some embodiments of the invention.

FIG. 8 is a flowchart showing an exemplary method 800 for operating a base station within a multihop network to optimize topology learning in the multihop network in accordance with some embodiments of the invention. The method 800 can reduce the amount of control traffic that occurs due to frequent topology changes in a multihop network.

Generally, the method 800 can be applied in a multihop network comprising a first type of node and a plurality of other nodes comprising at least one of a second type of node and a third type of node. For purposes of simplicity in the following description of method 800, the first type of node is referred to as a base station, the second type of node is referred to as a relay station (e.g., a node having a relay station node type), and the third type of node is referred to as a subscriber station (e.g., a node having a subscriber station node type). Moreover, although the following description describes a scenario where a single base station is utilized, it will be appreciated that the multihop network can include any number of base stations, relay stations and subscriber stations.

In addition, it will be appreciated that the method 800 can be applied to other scenarios where the first type of node is a first relay station, and the second type of node is a second relay station and the first relay station is located along a route between the base station and the second relay station such that the second relay station communicates with the base station via the first relay station. In this scenario, functionality for optimizing topology learning that is described below as taking place at the base station can be replicated at the first relay station. In other words, the functionality for optimizing topology learning can be distributed throughout the network so that the base station can implement the method 800 for optimizing topology learning with respect to its one hop mobile relay stations, and the first relay station can implement the method 800 for optimizing topology learning with respect to its one hop mobile relay stations which are at least two hops from the base station.

In one exemplary implementation, the multihop network complies with the IEEE 802.16j standard.

The method 800 starts at step 805, and at step 810, the base station receives a node identifier and status information from each of the nodes. The status information is described above.

At step 820, the base station stores the node identifier and the status information it receives from each of the nodes at step 810.

At step 830, the base station allocates a channel resource or resources to each of the relay stations having a mobile state (e.g., mobile relay stations). The channel resource is for exchanging topology information with the base station. The channel resource and topology information are described above. In addition, in some implementations, the base station allocates a second channel resource or resources to the particular relay station for exchanging other topology information with subscriber stations which are associated with the particular relay station and communicate with the base station via the relay station.

After the channel resource has been allocated, each of the relay stations determines its current mobility state and transmits a status message to the base station. At step 840, the base station receives a status message from the relay station. The status message includes a node identifier and status information for the relay station. The status information indicates that the mobility state of the relay station has changed. The current mobility state can be used by the base station to determine whether the mobility state of the relay station has changed from a mobile state to a non-mobile mobility state.

At step 850, based on the mobility state information in the status message, the base station can determine whether the relay station is mobile or non-mobile. If the base station determines that the relay station remains mobile, then the method 800 loops back to step 810. By contrast, if the base station determines that the relay station is non-mobile based on the status message, then at step 860 the base station de-allocates the channel resources previously reserved for or allocated to the relay station.

In the foregoing specification, specific embodiments of the present invention have been described. However, one of ordinary skill in the art appreciates that various modifications and changes can be made without departing from the scope of the present invention as set forth in the claims below. For instance, while the disclosure describes implementations where the base station reserves or allocates a channel resource to each of the mobile relay stations, the base station can also implement similar concepts for reserving or allocating a channel resource to mobile subscriber stations.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. In a multihop network comprising at least one first type of node and a plurality of nodes comprising at least one of a second type of node and a third type of node, a method comprising:
    transmitting a node identifier and status information from each of the nodes to the first type of node, wherein the status information associated with each node comprises: a node type comprising one of a second type of node and a third type of node, and a mobility state of the node comprising one of a fixed/stationary state or a mobile state;
    storing the node identifier and the status information from each of the nodes at the first type of node;
    allocating, at the first type of node, a channel resource to each of the second type of nodes having a mobile mobility state at a first time, wherein the channel resource is for exchanging topology information with the first type of node; and
    deallocating, at the first type of node, the previously allocated channel resource reserved for ones of the second type of nodes which have experienced a change from a mobile mobility state to a non-mobile mobility state during a period between the first time and a second time.

2. A method according to claim 1, wherein the status information associated with each node further comprises: an association type comprising a direct association type or indirect association type, and wherein the method further comprises:
    allocating, at the first type of node, a second channel resource to each of the second type of nodes having the mobile state,
    wherein the second channel resource is for exchanging topology information with the third type of nodes which are associated with the second type of node, wherein third type of nodes have the indirect association type.

3. A method according to claim 1, further comprising:
    determining a first mobility state at each of the second type of nodes and at each of the third type of nodes at the first time.

4. A method according to claim 3, further comprising:
    determining a new mobility state at each of the second type of nodes at the second time;
    determining, at each of the second type of nodes after the second time, whether the first mobility state of that node has changed with respect to their new mobility state.

5. A method according to claim 4, further comprising:
    determining, at each of the second type of nodes which determine that their first mobility state has changed, whether the first mobility state at each of the second type of nodes was mobile or non-mobile.

6. A method according to claim 1, wherein the first type of node comprises a base station.

7. A method according to claim 6, wherein the second type of node comprises a relay station.

8. A method according to claim 7, wherein the status information associated with the relay station comprises a relay station node type.

9. A method according to claim 8, wherein the status information associated with the relay station further comprises one of a mobile state and a fixed/stationary state.

10. A method according to claim 9, wherein the plurality of nodes further comprise:
    at least one mobile relay station, and wherein the mobile relay station has status information associated therewith comprising the relay station node type and the mobile state.

11. A method according to claim 1, wherein the third type of node comprises:
    a subscriber station, and wherein the status information associated with the subscriber station comprises a subscriber station node type.

12. A method according to claim 1, wherein the topology information comprises handoff information.

13. A method according to claim 1, wherein the topology information comprises routing information.

14. A method according to claim 1, wherein the topology information comprises link quality information.

15. A method according to claim 1, wherein the topology information comprises measurement reports information.

16. A method according to claim 1, wherein the topology information comprises Quality of Service information.

17. A method according to claim 1, wherein the first type of node comprises a first relay station.

18. A method according to claim 17, wherein the second type of node comprises a second relay station, and further comprising: a base station, wherein the first relay station is located along a route between the base station and the second relay station such that the second relay station communicates with the base station via the first relay station.

19. In a multihop network comprising at least one first type of node and a plurality of nodes comprising at least one of a second type of node and a third type of node, a method of operating the second type of node within the multihop network comprising:
    transmitting a node identifier and status information from each of the nodes to the first type of node, wherein the status information associated with each node comprises: a node type comprising one of a second type of node and a third type of node, and a mobility state of the node comprising one of a fixed/stationary state or a mobile state; and
    receiving a first message from the first type of node at each of the second type of nodes having a mobile state at a first time, wherein each first message specifies a channel resource allocated to a particular second type of node by the first type of node for exchanging topology information with the first type of node,
    wherein the first type of node de-allocates the previously allocated channel resources reserved for ones of the second type of nodes which have experienced a change from a mobile mobility state to a non-mobile mobility state during a period between the first time and a second time.

20. A method according to claim 19, wherein the status information associated with each node further comprises: an association type comprising a direct association type or indirect association type, and wherein the third type of nodes have the indirect association type, and wherein each first message further specifies a second channel resource allocated to a particular second type of node by the first type of node for exchanging other topology information with the third type of nodes which are associated with the particular second type of node.

21. A method according to claim 19, further comprising:
determining a first mobility state at each of the second type of nodes at the first time.

22. A method according to claim 21, further comprising:
determining a new mobility state at each of the second type of nodes at the second time; and
determining, at each of the second type of nodes after the second time, whether the first mobility state of that node has changed with respect to their new mobility state.

23. A method according to claim 22, further comprising:
determining, at each of the second type of nodes which determine that their first mobility state has changed, whether the first mobility state at each of the second type of nodes was mobile or non-mobile.

24. A method according to claim 19, wherein the topology information comprises at least one of: handoff information, routing information, link quality information, measurement reports information, and Quality of Service information.

25. In a multihop network comprising at least one first type of node and a plurality of nodes comprising at least one of a second type of node and a third type of node, a method of operating the first type of node within the multihop network comprising:
receiving, at the first type of node, a node identifier and status information from each of the nodes to the first type of node, wherein the status information associated with each node comprises: a node type comprising one of a second type of node and a third type of node, and a mobility state of the node comprising one of a fixed/stationary state or a mobile state;
storing, at the first type of node, the node identifier and the status information from each of the nodes;
allocating, at the first type of node, a channel resource to each of the second type of nodes having a mobile mobility state,
wherein the channel resource is for exchanging topology information with the first type of node; and
de-allocating, at the first type of node responsive to a message from a second type of node indicating it has changed from a mobile mobility state to a non-mobile mobility state, the previously allocated channel resource reserved for the second type of node.

26. A method according to claim 25, wherein the status information associated with each node further comprises: an association type comprising a direct association type or indirect association type, and wherein the method further comprises:
allocating, at the first type of node, a second channel resource to each of the second type of nodes having the mobile state,
wherein the second channel resource is for exchanging topology information with the third type of nodes which are associated with the second type of node, wherein third type of nodes have the indirect association type.

27. A method according to claim 25, wherein each of the second type of nodes determine whether their mobility state has changed from a mobile state to a non-mobile mobility state after the channel resource has been allocated, and
wherein each of the second type of nodes which determine that their first mobility state has changed transmit a message to the first type of node, wherein the message comprises an indication that the mobility state of that node has changed from the mobile mobility state to the non-mobile mobility state.

28. A method according to claim 25, wherein the topology information comprises at least one of: handoff information, routing information, link quality information, measurement reports information, and Quality of Service information.

* * * * *